United States Patent [19]

Bakanowski et al.

[11] Patent Number: 4,811,567

[45] Date of Patent: Mar. 14, 1989

[54] METHOD FOR TESTING THE OPERABILITY OF A REFRIGERANT SYSTEM

[75] Inventors: Stephen M. Bakanowski; William H. Mapes, both of Louisville, Ky.

[73] Assignee: General Electric Company, Louisville, Ky.

[21] Appl. No.: 163,844

[22] Filed: Mar. 3, 1988

[51] Int. Cl.[4] .............................................. G01M 19/00
[52] U.S. Cl. ......................................... 62/129; 62/469
[58] Field of Search ................. 62/125, 126, 127, 129, 62/130, 192, 193, 77, 298, 275, 276, 469, 468, 472

[56] References Cited

U.S. PATENT DOCUMENTS

| | | | |
|---|---|---|---|
| 2,447,894 | 8/1948 | Bauman | 62/129 X |
| 3,082,951 | 3/1963 | Kayan | 235/184 |
| 3,580,070 | 5/1971 | Cumpston, Jr. | 73/193 |
| 3,774,096 | 11/1973 | Hann | 318/436 |
| 4,066,869 | 1/1978 | Apaloo et al. | 62/472 X |
| 4,135,122 | 1/1979 | Holmquist et al. | 318/436 |
| 4,432,232 | 2/1984 | Brantley et al. | 73/432 R |
| 4,510,576 | 4/1985 | MacArthur et al. | 364/551 |
| 4,638,643 | 1/1987 | Sakazume et al. | 62/209 |

Primary Examiner—Harry B. Tanner
Attorney, Agent, or Firm—Frederick P. Weidner; Radford M. Reams

[57] ABSTRACT

A refrigerant system for a household refrigerator has its operability tested after assembly of the refrigerant system with a refrigerator cabinet. A rotary compressor of the refrigerant system is preheated, preferably by applying heat to its stator through a low AC voltage, for a predetermined period of time prior to activation of the rotary compressor. After the rotary compressor is activated, the temperature of one of the serially connected coils of the evaporator remote from the first coil is determined. If the coil temperature is within a predetermined range, this indicates the proper operability of the refrigerant system. Power consumption can be measured in conjuction with the temperature so that a significant increase or decrease in power consumption would indicate a defective refrigerant system notwithstanding the coil temperature being satisfactory.

20 Claims, 5 Drawing Sheets

4,811,567

METHOD FOR TESTING THE OPERABILITY OF A REFRIGERANT SYSTEM

FIELD OF THE INVENTION

This invention relates to a method for testing the operability of a refrigerant system and, more particularly, to a method for testing the refrigerant system after assembly of the refrigerant system with a refrigerator cabinet of a household refrigerator.

BACKGROUND OF THE INVENTION

After completion of assembly of a refrigerant system and a refrigerator cabinet of a household refrigerator, it is necessary to test the refrigerant system to insure that it is operable. Testing of the refrigerant system has previously been accomplished by running the compressor of the refrigerant system for a time period sufficient to establish evaporator flooding, which is when liquid refrigerant is converting to gas within that portion of the refrigerant system. At the end of this time period, the temperature at the entrance to the first coil of the serially connected coils of the evaporator has been measured. If the measured temperature is low enough such as 0° F., for example, the refrigerant system is deemed to be operable.

However, this test has occasionally permitted a defective refrigerant system to be deemed operable even though the temperature at the entrance to the first evaporator coil has been sufficiently low to indicate that the refrigerant system is functioning properly. It has been determined that this is because there is not sufficient mass of the refrigerant flowing through the evaporator coils although there has been sufficient mass flow to enable the temperature at the entrance of the first of the evaporator coils to have the required low temperature. This insufficient mass flow can be due to a restriction in the system to flow of the refrigerant, a defective compressor (e.g., a low capacity compressor), a low refrigerant charge, or a high oil charge. A high refrigerant charge or no oil also can cause a defective refrigerant system.

To avoid this problem of a defective refrigerant system being deemed operable, the method of this invention contemplates measuring the temperature of a coil of the evaporator remote from the entrance to the first coil of the evaporator. By determining the temperature of an evaporator coil remote from the first evaporator coil, a defective refrigerant system will not be passed as satisfactory. This is because an evaporator coil remote from the first evaporator coil will not produce the desired temperature if the refrigerant system is defective because of a restriction in the refrigerant system, an incorrect charge of refrigerant or oil in the refrigerant system, or a defective compressor. Experience has shown that a household refrigerator will almost certainly function properly when correct temperatures are produced about one-third to two-thirds of the length of an evaporator from its entrance during an abbreviated test.

When the refrigerant system includes a rotary compressor, it has been determined that it is necessary to activate the refrigerant system for a period of time in excess of forty-five minutes to enable measurement of the temperature in an evaporator coil sufficiently distant from the first evaporator coil to insure that the refrigerant system is operable when the temperature of the specific coil reaches a predetermined temperature of at least 0° F., for example. This relatively long period of time for testing each refrigerant system would significantly reduce productivity of household refrigerators in that the remainder of the manufacturing line could not operate any quicker. Therefore, it is desired that testing of the operability of a refrigerant system be completed in a minimum period of assembly line time.

In one assembly line, it has been determined that testing of the operability of a refrigerant system must be accomplished within twenty-eight minutes. Otherwise, the production line would have to be slowed so that the economics of the production of household refrigerators would be significantly affected.

The method of the present invention satisfactorily solves the foregoing problems by testing a refrigerant system of a household refrigerator within a specific time period of twenty-eight minutes while still being able to measure the temperature of an evaporator coil remote from the first evaporator coil. Applicants have determined that measuring the temperature of the twenty-eight coil will insure that the refrigerant system is operable while still being able to complete the test within the predetermined period of time.

SUMMARY OF THE INVENTION

The method of the present invention preheats a compressor of a refrigerant system for a predetermined period of time. This preheating of the compressor significantly reduces the total time for the refrigerant system to have an evaporator coil, which is remote from the first evaporator coil and has its temperature measured, to be cooled to the predetermined temperature if the refrigerant system is operable as indicated by flooding having occurred in this evaporator coil. Thus, the operability of the refrigerant system of the household refrigerator is ascertained within the time period allotted by the production line speed.

The test also preferably includes measuring the power consumption during the same time period. Even if the temperature at the remote evaporator coil is satisfactory, power consumption beyond a first predetermined limit or less than a second and lower predetermined limit indicates that the refrigerant system is defective.

An object of this invention is to provide a method for testing the operability of a refrigerant system.

Another object of this invention is to provide a method for testing the operability of a household refrigerator after completion of assembly of the refrigerant system and a refrigerator cabinet.

Other objects of this invention will be readily perceived from the following description, claims, and drawings.

BRIEF DESCRIPTION OF THE DRAWINGS

The attached drawings illustrate preferred embodiments of the invention, in which.

DESCRIPTION OF THE PREFERRED EMBODIMENT

Figure 1:
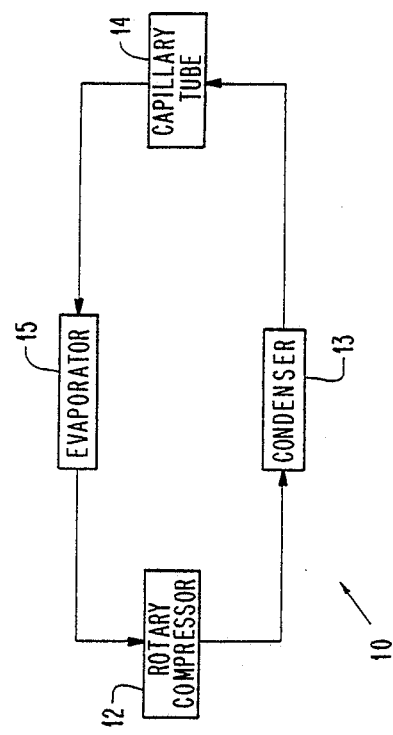
FIG. 1 is a schematic diagram of a refrigerant system of a household refrigerator to be tested by the method of the present invention.
Figure 4:
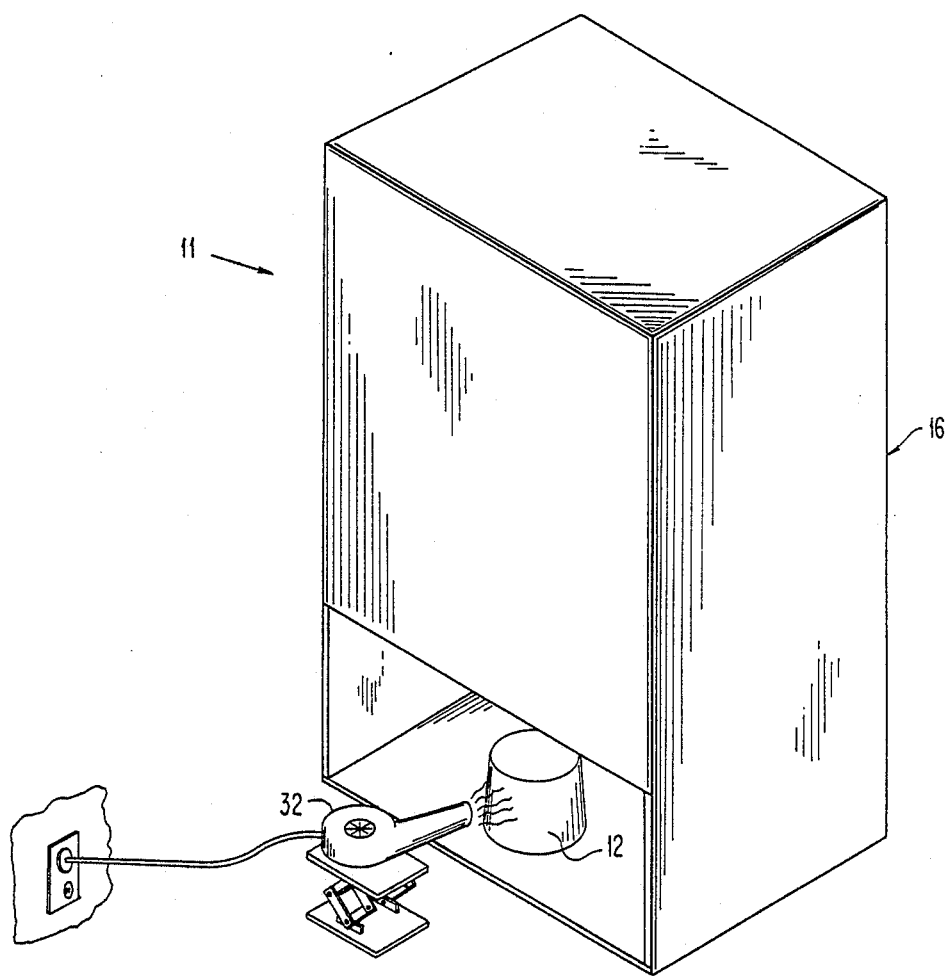
FIG. 4 is a schematic diagram of applying heat to a rotary compressor of the refrigerant system of FIG. 1 by blowing hot air over the rotary compressor.
Figure 6:
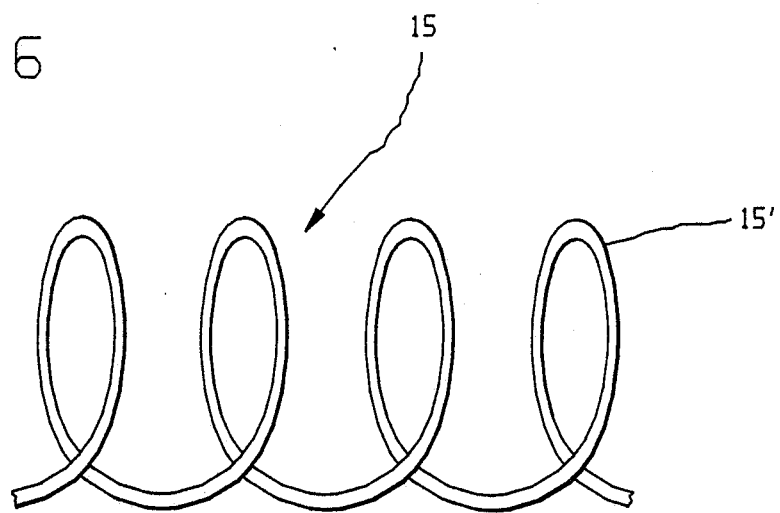
FIG. 6 is a schematic view of a portion of the evaporator of the refrigerant system being tested by the method of the present invention and showing a plurality of serially connected coils.

Referring to the drawings and particularly FIG. 1, there is shown a refrigerant system 10 of the well-known type used in a household refrigerator 11 (see FIG. 4) for cooling its fresh food and freezer compartments, for example. The refrigerant system 10 (see FIG. 1) includes a rotary compressor 12, a condenser 13, a capillary tube 14, and an evaporator 15. The evaporator 15 has a plurality of serially connected coils 15' (see FIG. 6) such as sixty coils, for example, with the first coil of the evaporator 15 (see FIG. 1) receiving the liquid refrigerant from the capillary tube 14 and the last coil of the evaporator 15 discharging the refrigerant as a gas to the inlet of the rotary compressor 12.

Testing of the refrigerant system 10 after completion of assembly of the refrigerant system 10 and a refrigerator cabinet 16 (see FIG. 4) to form the household refrigerator 11 is necessary to insure that the refrigerant system 10 (see FIG. 1) is operable. It is desired to complete testing of the refrigerant system 10 in as short a period of time as possible. This is desired so that the testing of the refrigerant system 10 of the household refrigerator 11 (see FIG. 4) will not slow down the production line of the household refrigerators 11. As previously mentioned, for one assembly line, it is necessary to complete the test of the refrigerant system 10 (see FIG. 1) within thirty minutes to avoid any slow down of the production line of the household refrigerators 11 (see FIG. 4).

The amount of a dissolved refrigerant within the oil in the rotary compressor 12 (see FIG. 1) is related to the temperature of the oil. As the temperature of the oil increases, the quantity of the refrigerant within the oil decreases.

The solubility of the refrigerant R12 in a typical refrigeration oil having a viscosity of approximately 150 Saybolt Universal Seconds at 100° F. and sold by Witco Chemical Corporation, New York, N.Y. as Suniso 3GS, for example, has been calculated by using 8.4 ounces of a charge of the refrigerant R12 and 155 cubic centimeters of the oil with the high side pressure of the rotary compressor 12 being 87 p.s.i.a. The solubility of the refrigerant R12 in the rotary compressor 12 as a function of the temperature of the oil and refrigerant solution is as follows:

| SOLUTION TEMPERATURE, DEGREES F. | WEIGHT FRACTION OF R12 IN THE OIL | R12 IN THE OIL, OUNCES |
|---|---|---|
| 90 | 0.47 | 4.3 |
| 100 | 0.34 | 2.6 |
| 110 | 0.28 | 1.9 |
| 120 | 0.23 | 1.5 |
| 130 | 0.20 | 1.2 |
| 140 | 0.17 | 1.0 |
| 150 | 0.15 | 0.88 |
| 160 | 0.14 | 0.77. |

Therefore, if the temperature of the oil and refrigerant solution in the rotary compressor 12 is increased prior to activating the rotary compressor 12, the amount of refrigerant in the oil of the rotary compressor 12 will be significantly reduced. This allows more refrigerant to be available to produce cooling in the coils 15' (see FIG. 6) of the evaporator 15 (see FIG. 1). It is preferred that the temperature of the oil and refrigerant solution in the rotary compressor 12 be heated to at least 110° F. and preferably 130° F. prior to activating the rotary compressor 12.

Figure 7:
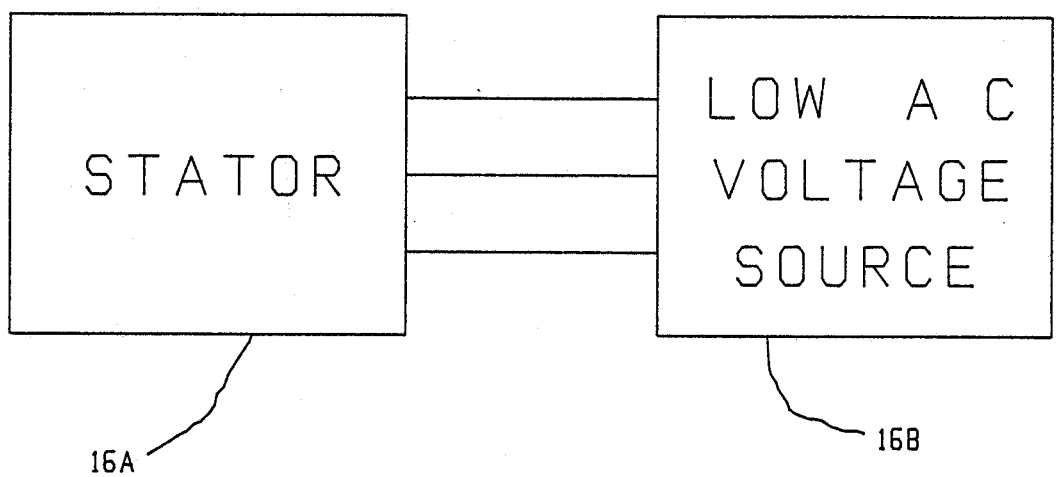
FIG. 7 is a schematic view showing the application of low voltage for the stator of the rotary compressor of the refrigerant system being tested by the method of the present invention.

The method of the present invention preferably preheats the rotary compressor 12 prior to activating the rotary compressor 12 by applying for a predetermined period of time a low AC voltage to the rotary compressor 12 rather than its operating or running voltage of 110 volts AC. The rotary compressor 12, which includes a single phase induction motor, has the voltage applied only to its stator 16A (see FIG. 7) from a low AC voltage source 16B.

By maintaining the AC voltage less than that required to cause the rotary compressor 12 (see FIG. 1) to run, the rotary compressor 12 is preheated without the rotary compressor 12 being activated. This increases the amount of refrigerant in the refrigerant system 10 available to produce refrigeration when the rotary compressor 12 is initially activated. By applying only 62 volts AC to the rotary compressor 12, more thermal energy is released into the rotary compressor 12 even though it does not run so as to cause the rotary compressor 12 to become hotter than if 110 volts AC were applied and the rotary compressor 12 ran for the same period of time.

Figure 3:
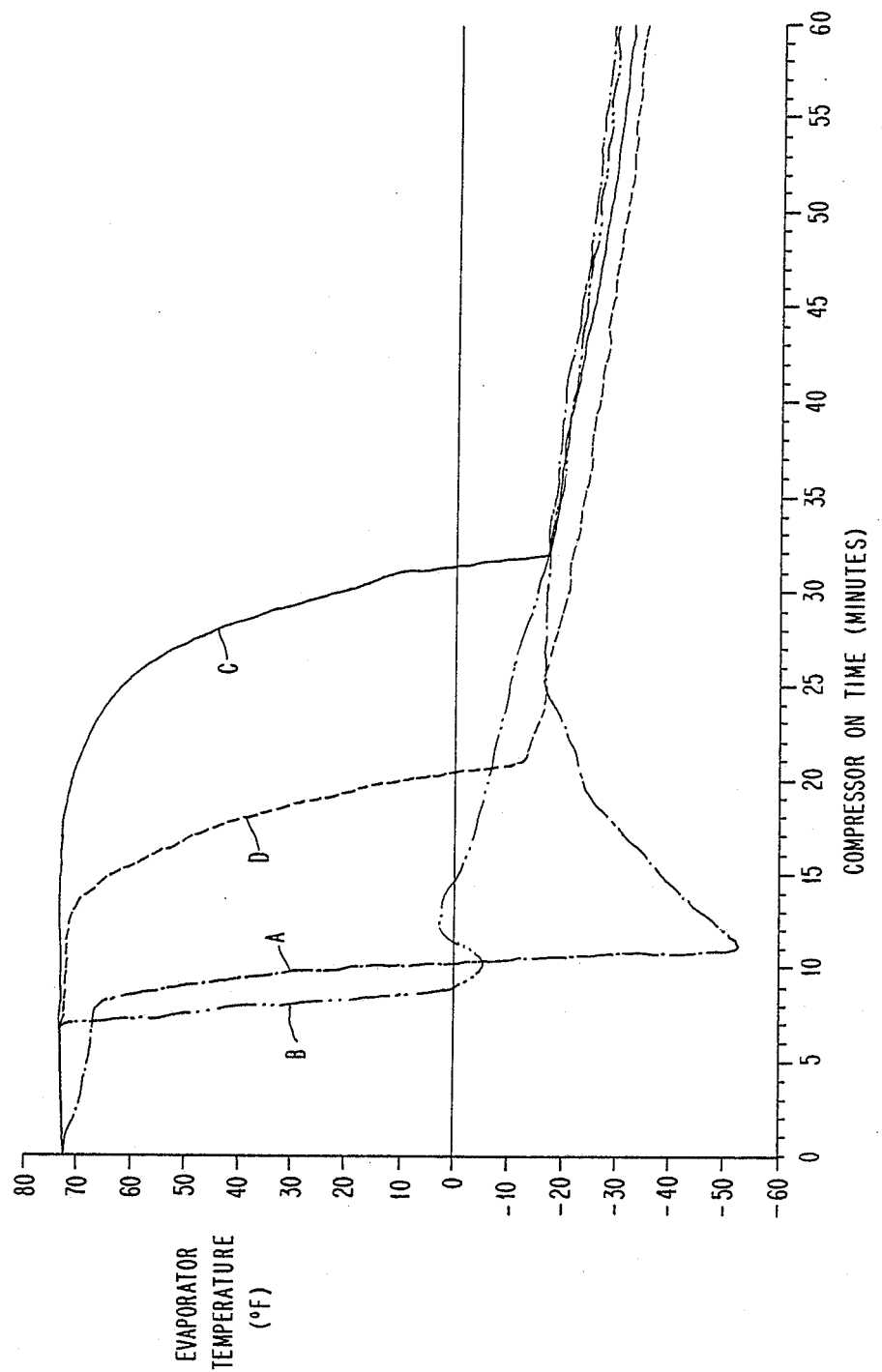
FIG. 3 is a graph showing the temperatures of two different evaporator coils of the refrigerant system of FIG. 1 when there is preheating of the rotary compressor prior to activation of the rotary compressor by applying a low AC voltage to the compressor stator and when there is no heating of the rotary compressor prior to activation and the time required for refrigeration to be produced under each condition with the on time of the rotary compressor including the preheating time when preheating occurs.

FIG. 3 shows the relation of the temperature of two different coils of the evaporator 15 (see FIG. 1) to the on time of the rotary compressor 12 when 62 volts AC is applied to the stator 16A (see FIG. 7) of the rotary compressor 12 (see FIG. 1) for seven minutes. After the rotary compressor 12 has been activated for seven minutes, it is inactivated for forty-five seconds to allow the rotary compressor 12 and the associated electrical protective devices to cool slightly so that the rotary compressor 12 will run when activated. Then, the rotary compressor 12 is activated for a predetermined period of time so that the total time from the start of the initial preheating is approximately twenty-eight minutes.

Curve A of FIG. 3 shows the temperature at the entrance to the first coil of the evaporator 15 (see FIG. 1) relative to the on time of the compressor 12 when there is no preheating of the rotary compressor 12.

Curve B of FIG. 3 discloses the relationship of the temperature at the entrance to the first coil of the evaporator 15 to the on time of the rotary compressor 12 when there is preheating of the rotary compressor 12 by applying 62 volts AC to the stator 16A (see FIG. 7) of the rotary compressor 12 (see FIG. 1) for seven minutes.

Curve C of FIG. 3 illustrates the relationship of the temperature of the fortieth coil of the evaporator 15 (see FIG. 1) relative to the on time of the rotary compressor 12 when there is no preheating of the rotary compressor 12. Curve D of FIG. 3 shows the temperature of the fortieth coil of the evaporator 15 (see FIG. 1) relative to the on time of the compressor 12 when there is preheating of the rotary compressor 12 by applying 62 volts AC for seven minutes to the stator 16A (see FIG. 7) of the rotary compressor 12 (see FIG. 1) prior to activation of the rotary compressor 12.

While the curve A of FIG. 3 shows less time for the temperature at the entrance of the first coil of the evaporator 15 (see FIG. 1) to produce refrigeration (0° F.) without preheating than at the fortieth coil of the evaporator 15 when there is preheating of the rotary compressor 12 as shown by the curve D of FIG. 3, the use of the temperature at the inlet to the first coil of the evaporator 15 (see FIG. 1) as the determinant as to whether the refrigerant system 10 is operable has not always indicated that the refrigerant system 10 is defective. This is because an insufficient mass of refrigerant flowing in the refrigerant system 10, as previously discussed, could prevent a coil of the evaporator 15 remote from the entrance to the first coil of the evaporator 15 from receiving sufficient refrigerant to produce cooling. Therefore, it is necessary to use one of the coils 15' (see FIG. 6) of the evaporator 15 (see FIG. 1) substantially remote from the entrance to the first coil of the evaporator 15 to insure that the refrigerant system 10 is not defective.

It has been found that the twenty-eighth coil of the evaporator 15 is satisfactory in that it reduces the time in comparison with the fortieth coil so as to insure that the test is completed within the predetermined time without slowing the production line but still is remote enough from the entrance to the first coil of the evaporator 15 so that it will not reach a predetermined temperature sufficient to indicate that it is capable of refrigeration unless the refrigerant system 10 is operable. An insufficient mass flow of refrigerant in the refrigerant system 10 so as to render it defective would not permit the twenty-eighth coil of the evaporator 15 to reach the predetermined temperature (0° F.) to indicate refrigeration.

The low voltage of 62 volts AC is preferably applied to the stator 16A (see FIG. 7) of the rotary compressor 12 (see FIG. 1) of the refrigerant system 10 during movement of the household refrigerator 11 (see FIG. 4) along a conveyor of an assembly or production line. The low voltage is applied through a bus bar, for example, which is adjacent the conveyor of the assembly or production line, to the input cord of the rotary compressor 12 (see FIG. 1) during travel of the household refrigerator 11 (see FIG. 4) on the conveyor of the assembly or production line.

After the preheating period of seven minutes is completed, the input cord for the rotary compressor 12 (see FIG. 1) does not receive any voltage for a predetermined short period of time such as forty-five seconds, for example. This allows the rotary compressor 12 and the associated electrical protective devices to cool slightly so that the rotary compressor 12 will run when 110 volts AC is applied. The 110 volts AC also is preferably applied through a bus bar as the household refrigerator 11 (see FIG. 4) having the refrigerant system 10 (see FIG. 1) is moved along the conveyor of an assembly or production line.

Figure 2:
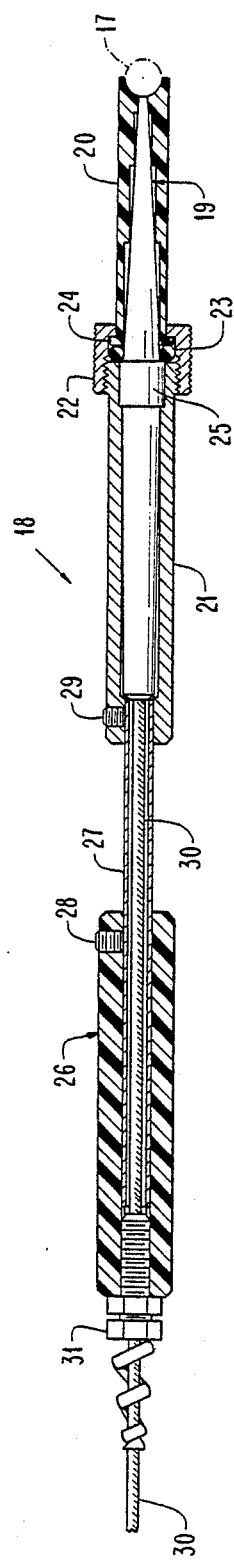
FIG. 2 is a sectional view of a device for measuring the temperature of an evaporator coil of the refrigerant system being tested by the method of the present invention.

The temperature of twenty-eighth coil 17 (shown in phantom in FIG. 2) of the coils 15' (see FIG. 6) of the evaporator 15 (see FIG. 1) of the refrigerant system 10 is determined through a temperature device 18 (see FIG. 2). The device 18 includes a temperature probe 19 for contacting the twenty-eighth coil 17 for determining its temperature.

One suitable example of the temperature probe 19 is a universal temperature probe sold by John Fluke Mfg. Co., Inc. as model 80T-150U. This probe is a self-contained temperature-to-voltage converter, which provides a direct temperature reading when it is connected to any high impedance digital multimeter capable of one millivolt resolution and at least a 300-count full scale read out capability.

A guide 20, which is formed of Teflon, for example, supports the end of the probe 19, which is to contact the evaporator coil 17. The guide 20 is attached to a tube 21 of aluminum through an aluminum coupling 22 having a serrated outer surface. A rubber seal 23 is disposed between a flange 24 on the end of the guide 20 and the adjacent end of the tube 21. The rubber seal 23 also bears against an enlarged portion 25 of the probe 19.

A handle 26, which is preferably formed of Textolite, is attached to a stainless steel tube 27 by a set screw 28. The stainless steel tube 27 is attached to the tube 21 by a set screw 29.

The probe 19 has an electric cord 30 extending through the stainless steel tube 27 and through a strain relief 31, which is attached to the handle 26. One suitable example of the strain relief 31 is sold by Heyco Molded Products, Kenilworth, N.J. as catalog No. 3237. The strain relief 31 holds the cord 30 of the probe 19 in place.

The cord 30 is connected to a computer (not shown) at which the temperature readings from the probe 19 are read in millivolts and recorded. If the temperature is not within a satisfactory range such as 0° F. to −40° F., for example, the refrigerant system 10 does not pass the operability test. If the temperature is lower than about −40° F., this would indicate that the refrigerant system 10 is defective because of an insufficient mass of refrigerant flowing through the refrigerant system 10.

The temperature device 18 (see FIG. 2) insures that the probe 19 has a good contact with the evaporator coil 17. This is because the evaporator coil 17 has frost built up on it during refrigeration and there must be a solid contact of the probe 19 with the evaporator coil 17 to insure that an accurate temperature reading is obtained.

The temperature device 18 is held by a user through grasping the handle 26 and applied to the evaporator coil 17 in the manner shown in FIG. 2. The user of the temperature device 18 is positioned along the conveyor of the assembly or production line at a location at which sufficient time has elasped from the time that the rotary compressor 12 (see FIG. 1) has been activated for the refrigerant system 10 to have the evaporator coil 17 (see FIG. 2) producing refrigeration.

It should be understood that this method of testing of the refrigerant system 10 (see FIG. 1) does not have to be during movement of the household refrigerator 11 (see FIG. 4) on the conveyor of an assembly or production line. That is, the household refrigerator 11 could be stationary and the temperature of the evaporator coil 17 (see FIG. 2) determined after the predetermined period of time has elapsed.

When the refrigerant system 10 (see FIG. 1) is being tested on the household refrigerator 11 (see FIG. 4) moving with the conveyor of the assembly or production line, the power consumption of the refrigerant system 10 (see FIG. 1) is ascertained shortly prior to when the temperature of the evaporator coil 17 (see FIG. 2) is determined by the temperature probe 18. This is accomplished by measuring the power consumption for only a few seconds with a watt-meter. If the power consumption is less or more than 150-160 watts such as 130 or 200 watts, for example, then the refrigerant system 10 (see FIG. 1) is not satisfactory. Thus, even though the temperature of the evaporator coil 17 (see FIG. 2) is within the predetermined temperature range so as to indicate that the refrigerant system 10 (see FIG. 1) is satisfactory, the refrigerant system 10 is not satisfactory when the power consumption is too high or too low.

The high power consumption could indicate, for example, that the refrigerant system 10 has a double charge of refrigerant. The high power consumption also could indicate that no oil has been provided in the rotary compressor 12.

Furthermore, when the twenty-eighth evaporator coil 17 (see FIG. 2) does not have its temperature within the predetermined temperature range to indicate that refrigeration has occurred, this may indicate a low charge of refrigerant in the refrigerant system 10 (see FIG. 1), a restriction, or a double charge of oil. When any of these occurs, the power consumption also would be less than the normal power consumption to indicate such.

Instead of applying heat to the rotary compressor 12 by applying a low voltage to its stator 16A (see FIG. 7), the rotary compressor 12 (see FIG. 1) may be preheated by blowing hot air on the rotary compressor 12 for a predetermined period of time. This application of hot air may be accomplished by a hot air blower 32 (see FIG. 4), for example, applying heat at a selected temperature directly to the rotary compressor 12 for a predetermined period of time while the rotary compressor 12 is running. Thus, there is no shutdown of the rotary compressor 12 as occurs when the low AC voltage is supplied to the stator of the rotary compressor 12 for preheating the rotary compressor 12.

One suitable example of the hot air blower 32 is a hot air blower sold by Clements Mfg. Co., Chicago, Ill. as a flameless torch model FT1000. Instead of using the hot air blower 32, any other suitable means for applying the heated air could be utilized.

Figure 5:
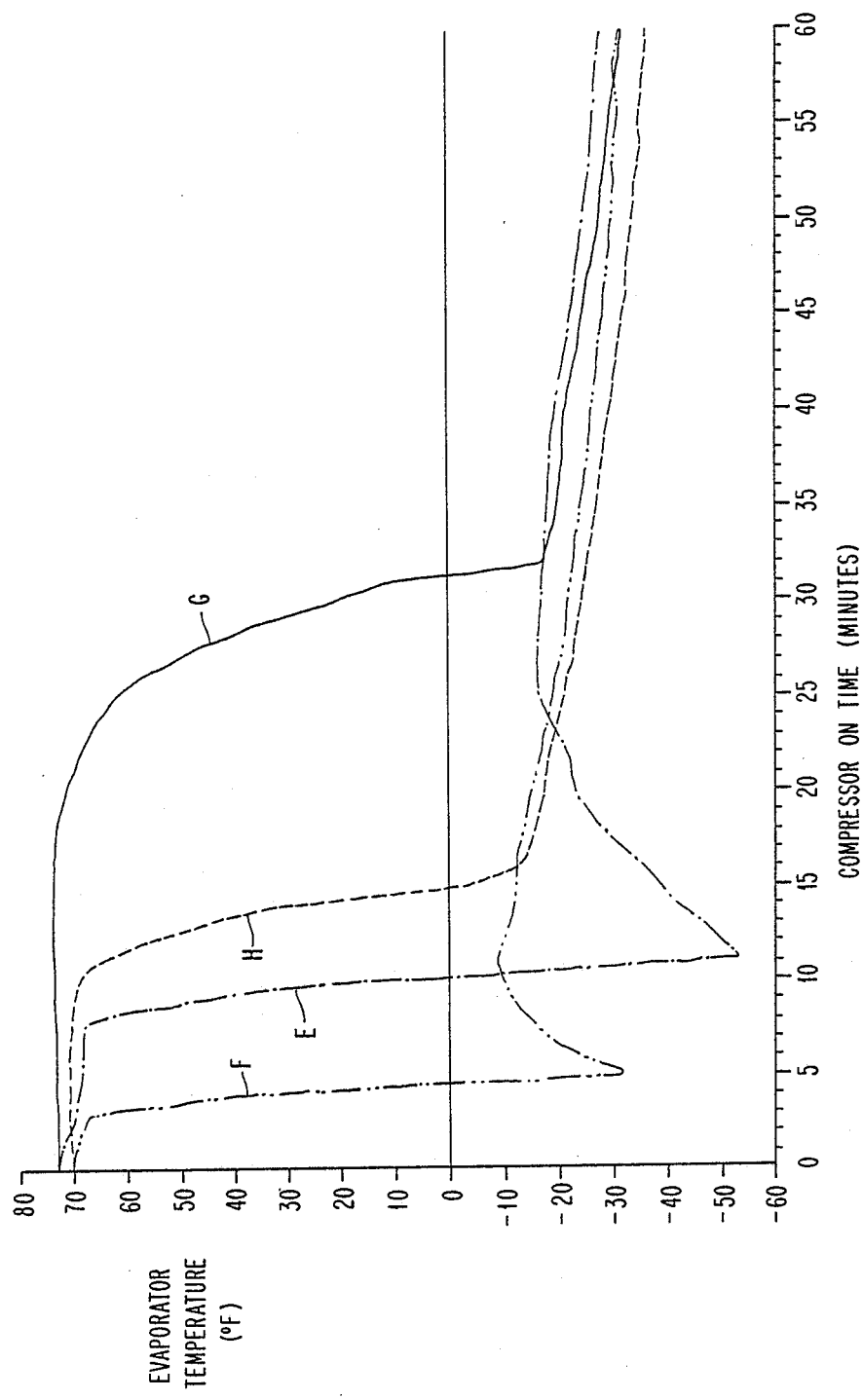
FIG. 5 is a graph showing the temperatures of two different evaporator coils of the refrigerant system of FIG. 1 when there is preheating by applying hot air initially to the rotary compressor while the rotary compressor is running and when not applying hot air while the rotary compressor is running and the time required for each with the on time of the rotary compressor including the time when hot air is initially applied to the rotary compressor.

Curve E of FIG. 5 shows the time required for the temperature at the entrance to the first coil of the evaporator 15 (see FIG. 1) to produce refrigeration from the time that the rotary compressor 12 starts running when there is no heated air applied thereto. Curve F of FIG. 5 discloses the temperature at the entrance to the first coil of the evaporator 15 (see FIG. 1) when there is preheating of the rotary compressor 12 for eleven minutes by applying hot air at approximately 180° F. by the hot air blower 32 (see FIG. 4) while the rotary compressor 12 is running.

Curve G of FIG. 5 illustrates the time required for refrigeration to be produced in the fortieth coil of the evaporator 15 (see FIG. 1) when there is no preheating of the rotary compressor 12. Curve H of FIG. 5 discloses the time required for the temperature of the fortieth coil of the evaporator 15 (see FIG. 1) to produce refrigeration when the rotary compressor 12 is initially heated with approximately 180° F. hot air for eleven minutes by the hot air blower 32 (see FIG. 4) while the rotary compressor 12 is running.

The curve E of FIG. 5 shows that less time is required for the entrance to the first coil to produce refrigeration than for the fortieth coil to produce refrigeration as shown by the curve H. However, as previously discussed, there must be a measurement of a coil of the evaporator 15 (see FIG. 1) sufficiently remote from the entrance to the first coil of the evaporator 15 to insure that the refrigerant system 10 is not defective.

While the method of the present invention has described the power consumption of the refrigerant system 10 as also being ascertained to determine if the refrigerant system 10 is satisfactory, it should be understood that such is not necessary for detecting any defect produced by insufficient mass flow. However, the ascertaining of the power consumption of the refrigerant system 10 provides a better test since this enables detection of an insufficient oil charge in the rotary compressor 12 or a high refrigerant charge, for example.

While the method of the present invention has described preheating of the rotary compressor 12 through applying a low AC voltage to the stator 16A (see FIG. 7) of the rotary compressor 12 (see FIG. 1), it should be understood that a low DC voltage could be employed. However, a low DC voltage has the disadvantage of possibly arcing and welding of components when the DC voltage is interrupted.

It should be understood that the preheat voltage applied to the rotary compressor 12 will be different for different sizes of the rotary compressor 12. Thus, the curves A-D of FIG. 3 and E-H of FIG. 5 have been produced with the rotary compressor 12 (see FIG. 1) having a nominal cooling capacity of 1000 BTU/hour. When the rotary compressor 12 has a nominal cooling capacity of 800 BTU/hour, for example, the preheat voltage would only be 55 volts AC for seven minutes. With the smaller size of the rotary compressor 12, a shorter time period would be used when heated air is applied to preheat the rotary compressor 12.

It also should be understood that one of the other coils (see FIG. 6) of the evaporator 15 than the twenty-eighth coil 17 (see FIG. 2) may have its temperature determined as long as the coil is between about one-third to two-thirds of the length of the evaporator 15 (see FIG. 1) from its entrance.

An advantage of this invention is that it decreases the time for testing a refrigerant system of a household refrigerator in comparison with earlier tests. Another advantage of this invention is that more accurate testing is obtained.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A method for testing, prior to initial operation, the operability of a refrigerant system including a compressor and an evaporator having a plurality of serially connected coils, the method including:
   applying heat to the compressor for a predetermined period of time;
   determining the temperature of one of the serially connected coils of the evaporator remote from the first of the coils of the evaporator through which refrigerant flows after the compressor is activated for a predetermined period of time;
   and ascertaining if the determined temperature is within a predetermined range to indicate that the refrigerant system is operable.

2. The method according to claim 1 including applying a low AC voltage, less than the voltage that will cause the compressor to run, to a stator of the compressor for a predetermined period of time to apply heat to the compressor prior to the compressor being activated.

3. The method according to claim 2 including applying the AC voltage for a predetermined period of time to initially heat the refrigerant and oil solution to a temperature of at least 110° F.

4. The method according to claim 3 including determining the temperature of a coil of the evaporator between one-third and two-thirds of the length of the evaporator from its entrance.

5. The method according to claim 4 in which the compressor being preheated is a rotary compressor.

6. The method according to claim 2 including determining the temperature of a coil of the evaporator between one-third and two-thirds of the length of the evaporator from its entrance.

7. The method according to claim 6 in which the compressor being preheated is a rotary compressor.

8. The method according to claim 2 in which the compressor being preheated is a rotary compressor.

9. The method according to claim 1 including applying heated air to the compressor for a predetermined period of time to apply heat to the compressor.

10. The method according to claim 9 including applying heated air for a predetermined period of time while the compressor is activated to initially heat the refrigerant and oil solution to a temperature of at least 110° F.

11. The method according to claim 10 including determining the temperature of a coil of the evaporator between one-third and two-thirds of the length of the evaporator from its entrance.

12. The method according to claim 11 in which the compressor being preheated is a rotary compressor.

13. The method according to claim 9 including determining the temperature of a coil of the evaporator between one-third and two-thirds of the length of the evaporator from its entrance.

14. The method according to claim 13 in which the compressor being preheated is a rotary compressor.

15. The method according to claim 9 in which the compressor being preheated is a rotary compressor.

16. The method according to claim 1 including determining the temperature of a coil of the evaporator between one-third and two-thirds of the length of the evaporator from its entrance.

17. The method according to claim 16 in which the compressor being preheated is a rotary compressor.

18. The method according to claim 1 including applying a voltage for a predetermined period of time to a stator of the compressor that will not cause the compressor to run to apply heat to the compressor prior to the compressor being activated.

19. The method according to claim 18 in which the compressor being preheated is a rotary compressor.

20. The method according to claim 1 in which the compressor being preheated is a rotary compressor.

* * * * *